United States Patent

[11] 3,576,547

| | | | |
|---|---|---|---|
| [72] | Inventor | Ralph E. Aldrich | |
| | | Woburn, Mass. | |
| [21] | Appl. No. | 778,168 | |
| [22] | Filed | Nov. 22, 1968 | |
| [45] | Patented | Apr. 27, 1971 | |
| [73] | Assignee | Itek Corporation | |
| | | Lexington, Mass. | |

[54] INTERFEROMETRIC READOUT OF ELECTRIC FIELDS
14 Claims, 2 Drawing Figs.

[52] U.S. Cl. .................................................... 340/173,
96/1, 353/25
[51] Int. Cl. .................................................... G11c 11/42
[50] Field of Search ........................................... 340/173
(LM), 173 (LSS); 96/1; 95/37, 38; 353/20

[56] References Cited
UNITED STATES PATENTS
3,296,594    1/1967    Van Heerden ............... 340/172.5

*Primary Examiner*—Terrell W. Fears
*Attorneys*—Homer O. Blair, Robert L. Nathans, W. Gary Goodson and Joseph S. Iandiorio

ABSTRACT: A method and apparatus are disclosed for interferometric readout of an information pattern stored by means of an electric field associated with a medium whose index of refraction varies as a function of an applied electric field by sensing the intensity of the interference pattern produced by the merging of a beam which has propagated through the medium with a beam which has not, both beams having been derived from a single beam of coherent radiation.

PATENTED APR 27 1971

3,576,547

RALPH E. ALDRICH
INVENTOR.

BY *Joseph S. Iandiorio*

ATTORNEY.

INTERFEROMETRIC READOUT OF ELECTRIC FIELDS

CHARACTERIZATION OF INVENTION

The invention is characterized in an information retrieval method for interferometric readout of an information pattern stored in the form of an electric field associated with a medium whose index of refraction varies as a function of an applied electric field, comprising splitting a beam of coherent radiation into a first beam and a second beam and directing the first beam through the medium, recombining the beams, and sensing the intensity of the interference pattern produced by the recombined beams, which intensity varies as a function of the variations of the index of refraction of the medium.

BACKGROUND OF INVENTION

This invention relates to interferometric readout of information patterns stored by means of an electric field associated with a medium.

Various devices are being used and developed which use an electric field associated with a medium to store information supplied in the form of a pattern of radiation. Such devices may use certain semiconductor, electro-optic, or dielectric materials alone or in various combinations to achieve the storage capability.

SUMMARY OF INVENTION

Thus it is desirable to have available an improved method and apparatus for retrieving information stored by means of an electric field associated with a medium.

It is also desirable to have available such a method and apparatus which uses the effect of the electric field on an electro-optic characteristic of the medium to readout the stored information.

It is also desirable to have available such a method and apparatus for creating an interference pattern representative of the variation of the index of refraction of the medium, and sensing the intensity of the interference pattern which intensity varies as a function of the electric field associated with the medium.

It is also desirable to have available such a method and apparatus which is simple, inexpensive and capable of high sensitivity readout.

The invention may be accomplished by beam splitting means for separating a beam of coherent radiation into a first beam directed through the medium and a second beam; beam joining means for recombining the first and second beams; and means for sensing the intensity of the interference pattern produced by the recombined beams, which intensity varies as a function of the variations of the index of refraction of the medium.

DISCLOSURE OF PREFERRED EMBODIMENT

Other objects, features and advantages will occur from the following description of a preferred embodiment and the accompanying drawings, in which.

Interferometric readout of information in a storage medium whose index of refraction varies as a function of an electric field associated with the medium may be accomplished according to this invention by providing a scanning beam of collimated radiation to a beam splitter which divides that beam into two equal intensity beams. One of the two beams is transmitted through the medium in which the information to be retrieved is stored and then to the same beam joiner. The apparatus is arranged so that, when the medium has no information stored in it, i.e. no electric field associated with it which may vary the order of refraction, the distances traveled by the two beams have equal optical path lengths; the two beams are thus in phase when they reach the beam joiner and they form a single beam having the intensity of the original input beam. If the medium has information stored in it, the electric field associated with the medium varies the index of refraction of the medium thus the retardation of the beam transmitted by it. As the beam scans across the beam splitter, the derivative beam encounters varying retardation as it scans the medium. The varying retardation impressed on that beam causes the interference pattern generated by the recombination of the two beams to vary and the intensity of the varying interference pattern may be sensed to provide a representation of the information stored in the medium. The two beams need not be set to be in phase at the beam joiner when there is no information stored in the medium. Rather, any desired phase relationship may be arranged between the two beams, and the sensing device beyond the beam joiner is then set to recognize the intensity level corresponding to that relationship, variations from which indicate variations in the index of refraction of the medium. For example, the two beams may be set 180° or one-half wavelength out of phase so that any deviation from a zero intensity output at the beam joiner indicates a variation in the index of refraction of the medium.

Various devices by means of which information may be stored by means of an associated electric field either internal or external may be readout by the apparatus and method of this invention. For example: an electro-optic material and material exhibiting persistent internal polarization may be made into such a device either by having one layer of each material or one layer of both materials combined with a layer of inert material; a layer of ferroelectric and electro-optical material and a layer of photoconductive material may also serve as such a medium; a layer of material which is electro-optic and exhibits persistent internal polarization may be combined with a layer of photoconductive material to form such a device. Other combinations containing an electric-optic material whose index of refraction varies with an applied electric field are susceptible to readout by the apparatus and method of this invention.

Figure 1:
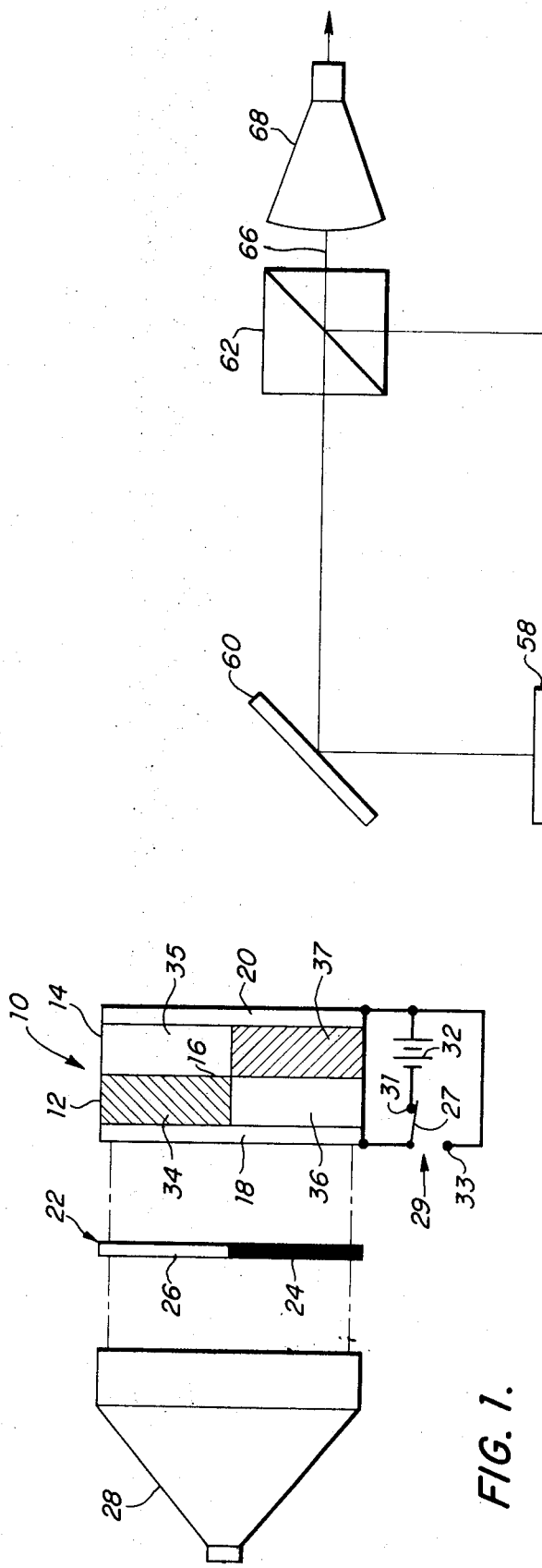
FIG. 1 is a diagrammatic side view showing the manner of storing information in a storage device which may be readout according to this invention.

In FIG. 1 is shown one example of a storage medium or device 10 having information stored in it by means of an internal electric field which may be readout according to this invention. A semiconductor material, such as photoelectret 12 and an electro-optic element 14 such as ZnS whose index of refraction varies as a function of an applied electric field are joined together at interface 16 between two electrodes 18 and 20. The pattern on transparency 22 consisting, for simplicity, of a single high density area 24 and a single low density area 26 may be stored in photoelectret 12 by irradiating photoelectret 12 through transparency 22 with radiation from source 28. The image of the information object is focused on the storage medium. With a voltage source 32 connected between electrodes 18 and 20, an electric field is established in photoelectret 12 in a pattern similar to the density pattern on transparency 22. Section 34 of photoelectret 12 receiving high intensity radiation through low density area 26 has a strong internal field established in it on shorting the electrodes, while section 36 of photoelectret 12 receiving low intensity radiation through high density area 26 has a weak internal field established in it. A negative image may be obtained by not shorting the sample, or by charging the sample uniformly, shorting, and selectively depolarizing with an image. Shorting device 10 is accomplished by swinging blade 27 of switch 29 from contact 31 to contact 33. The strong electric field in section 34 produces a substantial change in the index of refraction in section 35 of electro-optic element 14 and the weak electric field in section 36 produces little change in the index of refraction in section 37 of electro-optic element 14.

Figure 2:
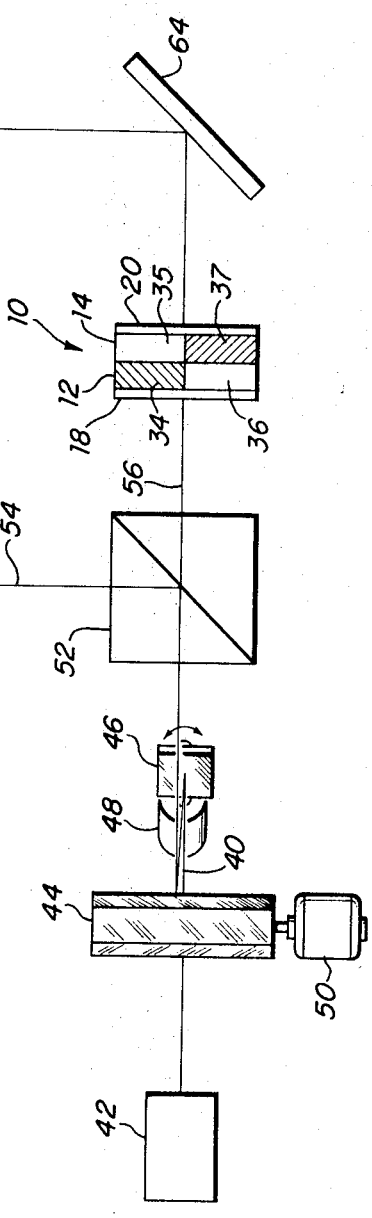
FIG. 2 is a diagrammatic view of apparatus according to this invention for reading out information stored in a device such as the device shown in FIG. 1.

One embodiment of the invention for reading out the information stored in photoelectret 12 is shown in FIG. 2. A beam 40 of collimated radiation supplied by laser 42 is swept up and down member 44 by oscillating mirror 46 driven by motor 48. Member 44, a hexagonal prism constructed of six mirrors, is rotated by motor 50 to sweep the beam 40 received from mirror 46 back and forth across beam splitter prism 52. Beam 40 is thereby scanned over prism 52 in a raster similar to that used in television systems.

Prism 52 splits beam 40 into two beams 54, 56, preferably having equal intensity. Beam 54 is reflected by prism 52 through retardation plate 58 to mirror 60 and from mirror 60 to beam joining prism 62. Beam 56 passes through prism 52 and through device 10 to mirror 64 and from mirror 64 to prism 62. The intensity of the beam 66 formed by the recombining of beams 54 and 56 by prism 62 is sensed by imaging tube 68. If beams 54 and 56 are in phase when recombined the intensity of beam 66 equals the total of the intensities of beams 54 and 56. Any phase variation between beams 54 and 56 causes the intensity sensed by tube 68 to vary accordingly.

Beams 54 and 56 travel equal physical distances between prisms 52 and 62 but not equal optical distances. Retardation plate 58 retards beam 54 by an amount equal to the retardation introduced by device 10 with no electric field present in it plus one-half the wavelength of the radiation. Beams 54 and 56 are therefore one-half wavelength out of phase when they are merged at prism 62 and destructive interference is produced resulting in beam 66 having zero intensity. Any further phase shifting introduced in either beam unbalances the complete intensity cancellation of beams 54 and 56 and an intensity increase is sensed at tube 68. Thus alterations in the index of refraction of element 14 caused by the electric field present in photoelectret 12 as a result of the information pattern stored in it may be sensed as variations in the intensity of the interference pattern in beam 66.

Various phase relationships between beams 54 and 56 may be established as the reference condition and deviations from that condition interpreted as variations in the electric field of device 10. For example, retardation plate 58 may be used to retard beam 54 only as much as device 10 retards beam 56 when device 10 has no electric field in it. The intensity of beam 66 will then be twice the intensity of either beam 54 or 56 and deviations from that level of intensity may be interpreted as variations in the electric field of device 10. Any other phase relationship between beams 54 and 56 may be used as the reference condition from which deviations in phase are measured. The phase relation between beams 54 and 56 may be accomplished by adjusting, either optically or physically or both, the distances each beam travels between prisms 52 and 62. The arrangement of the components is not limited to the configuration of FIG. 2. For example, prism 62 may be eliminated and tube 68 arranged to view the intersection of beams 54 and 56, or prism 62 (with tube 68) and mirror 64 may be interchanged so that beam 56 travels along one side of a rectangle formed by the components while beam 54 travels along three sides of that rectangle.

All The information in device 10 may be readout simultaneously, in parallel, by irradiating all of device 10 at one time rather than scanning device 10 to perform serial readout as in FIG. 2. Other means of sensing the intensity of the interference pattern may be used instead of tube 68, for example, photograph plates, paper or film, or photoelectric devices.

Other embodiments will occur to those skilled in the art and are within the following claims:

I claim:

1. Information retrieval apparatus for interferometric readout of an information pattern stored in the form of an electric field associated with a medium whose index of refraction varies as a function of an applied electric field comprising:
   beam splitting means for separating a beam of coherent radiation into a first beam directed through said medium and a second beam;
   beam joining means for recombining said first and second beams; and
   means for sensing the intensity of the interference pattern produced by the recombined beams, which intensity varies as a function of the variations of the index of refraction of said medium.

2. The apparatus of claim 1 further including an optical path length compensator positioned in the path of said second beam to adjust the optical path length of said second beam.

3. The apparatus of claim 1 further including a source of coherent radiation for providing a beam of coherent radiation to said beam splitting means.

4. The apparatus of claim 3 in which said source of coherent radiation includes a laser.

5. The apparatus of claim 1 in which said beam joining means includes deflection means for establishing an intersection of said beams.

6. The apparatus of claim 5 in which said beam joining means further includes a beam joiner at said intersection to merge those beams into a single beam.

7. The apparatus of claim 5 in which said deflection means is disposed in the path of said second beam.

8. The apparatus of claim 5 in which said deflection means includes two spaced reflecting members.

9. The apparatus of claim 2 in which said compensator includes a retardation plate.

10. The apparatus of claim 1 in which said means for sensing includes an imaging tube.

11. The apparatus of claim 3 in which said source of coherent radiation includes a scanning mechanism for sweeping said beam across said medium in a predetermined raster.

12. An information retrieval method for interferometric readout of an information pattern stored in the form of an electric field associated with a medium whose index of refraction varies as a function of an applied electric field, comprising:
   splitting a beam of coherent radiation into a first beam and a second beam and directing said first beam through said medium;
   recombining said beams; and
   sensing the intensity of the interference pattern produced by the recombined beams, which intensity varies as a function of the variations of the index of refraction of said medium.

13. The method of claim 12 further including adjusting the optical path length of one of said beams relative to the other.

14. The method of claim 13 in which the optical path length of said first beam is retarded relative to the optical path length of said second beam.